Patented Nov. 28, 1933

1,936,936

UNITED STATES PATENT OFFICE 1,936,936

PREPARATION OF CATALYTIC MATERIAL

Mayor Farthing Fogler, Solvay, N. Y., assignor to Atmospheric Nitrogen Corporation, New York, N. Y., a corporation of New York No Drawing. Application April 4, 1929
Serial No. 352,608

13 Claims. (Cl. 23—234)

This invention relates to the production of catalyst material. More particularly, this invention relates to a process for the production of catalyst material having a substantially uniform granule size and for the utilization of catalyst fines in the production of said catalyst material.

In the manufacture of catalysts containing oxides of metals wherein a mixture of materials containing as one ingredient one or more soluble salts in solution is heated to dry out the solvent and to decompose the salt and form the oxide, the product of the heating and decomposing step is frequently in the form of a more or less hard, firm cake. This cake is then broken up into particles and screened, the portion of the material having a desirable substantially uniform particle size being separately recovered for use as a catalyst. A quantity of the material is in the form of particles having a smaller size than is desirable. This portion, the so-called fines, may amount to 40% or more of the total material in the original cake.

It has been proposed to utilize these fines by dissolving them for example in an acid, and employing the solution thus formed for the production of a further quantity of the cake, which is then broken down and again screened, yielding more catalyst material having the desired particle size. This method is unsatisfactory since it requires the expenditure of considerable quantities of costly chemical reagents to convert the fines, consisting of oxide material, into soluble salts. This chemical conversion of the fines is accompanied, in actual practice, by considerable losses of the chemical reagents employed and requires a comparatively expensive installation of apparatus for carrying it out.

It is the object of this invention to provide a process adapted for the utilization and recovery of these fines in the form of catalyst material satisfactory for commercial use in a simple inexpensive manner without necessitating their chemical conversion. My invention has for a further object, the utilization of catalyst fines in the production of catalyst material having a substantially uniform granule size. As used in this specification and in the claims appended hereto, the term "granule size" as applied to a material, refers to the size of the separate pieces or aggregates of which the material is made up.

I have discovered that these fines may be utilized in a simple inexpensive manner without necessitating their solution. The utilization of the fines, in accordance with this invention, is accomplished by mixing them with the materials from which a further quantity of the catalyst is to be produced at that stage of the production of the catalyst wherein a liquid, and preferably a solution of a salt of one or more of the catalyst components, is present, whereby agglomeration occurs.

For purposes of illustration, the invention is described in connection with the production of a catalyst containing oxides of cobalt and aluminum suitable for the oxidation of ammonia, as for example, disclosed in U. S. Pat. No. 1,399,807 dated December 31, 1921. A satisfactory cobalt oxide-aluminum oxide catalyst material may be prepared as follows:

An aqueous solution of cobalt nitrate is mixed with finely divided alumina. This mixture is then heated, first to drive off the water, and finally to decompose the nitrate. When the decomposition is completed, the product is allowed to cool and the resulting cake is broken up and screened to recover that portion of the broken up material having a particle size, such that for example, it passes through a 6 mesh screen and remains on a 14 mesh screen (a 6 to 14 mesh material). About 60% of the original cake is recovered as useable material (6 to 14 mesh) and about 40% consists of fines (less than 14 mesh). The amounts of cobalt nitrate and of alumina employed are preferably such that the product after decomposition of the nitrate contains about 85% cobalt oxide ($Co_2O_3$) and 15% alumina ($Al_2O_3$).

As heretofore carried out, these fines obtained in the production of catalyst material, represented a loss. In accordance with my invention the catalyst fines are preferably finely divided, for example, ground to pass a 100 mesh screen, and are mixed with new material, in this case alumina and an aqueous solution of cobalt nitrate, which is to be employed in the production of a further quantity of the catalyst. This mixture of catalyst fines, cobalt nitrate solution and alumina, is proportioned to contain a quantity of catalyst fines determined by the amount of cobalt nitrate present, as will be hereinafter described, and alumina in amount equivalent to the cobalt nitrate such that after decomposition of the cobalt nitrate the product contains cobalt oxide and alumina in the desired proportions; in this example about 85 parts of cobalt oxide to about 15 parts of alumina. In other words, the constituents of the new material are so proportioned that the catalyst material produced has substantially the same composition as the fines utilized in its production. The mixture is then heated and decomposed to form a cake or agglomerated mass and treated as described above in connection with the preparation of the original catalyst material. The fines recovered from this second process may likewise be utilized for the production of still further quantities of catalyst material. It has been found in the production of a cobalt oxide-aluminum oxide catalyst as described above, that about 100 gms. of fines may be advantageously added to a mixture of 15 gms. alumina with a substantially saturated aqueous solution containing 187 gms. of cobalt nitrate. Further, it has been found that a quantity of fines substantially three times the calculated weight of catalyst from new material, may be added prior to the evaporation of the cobalt nitrate solution and decomposition of the nitrate to form an agglomerated product without substantially changing the physical and catalytic characteristics of the catalyst, and satisfactory catalysts have been made in which the ratio of fines to new material, calculated as catalyst product, varied from 75:25 to 25:75.

While the above processes for the production of catalyst material illustrate and explain the present invention, it is evident that many modifications may be made in the particular processes as set forth and that the invention may be employed for the production of other catalysts or for the utilization of other types of finely divided catalyst material. For example my invention is applicable to a cobalt oxide catalyst which does not contain alumina as a promoter, by adding to the aqueous solution of cobalt nitrate the solid finely divided cobalt oxide fines resulting from prior catalyst production and then heating the mixture to dry it and to decompose the cobalt nitrate to form cobalt oxide. The resulting cake is broken up, and the portion having, for example, a particle size of 6 to 14 mesh recovered. These fines are preferably ground to pass a 100 mesh screen and are employed in the production of a further quantity of the catalyst in the manner described.

Again, during the conversion of ammonia into nitrogen oxides by catalysis employing the above described catalysts, some of the catalyst material may deteriorate or disintegrate. This material is available for use as the fines in the above described processes for the production of new catalyst material. Furthermore, instead of employing a solution of a nitrate, other liquid agglomerating agent may be employed. In the first example described above, the component of the catalyst other than the cobalt oxide (the alumina), is mixed with the cobalt nitrate solution and fines in the form of the oxide. It is evident, however, that this step of the process may be modified by employing a salt of aluminum which is decomposed by the subsequent treatment to form aluminum oxide, and when in the claims the term "components of said catalyst material" is employed, it is intended to refer to the components either as such or in the form of compounds which yield the catalyst component itself during subsequent treatment.

I claim:

1. In the process of producing an ammonia oxidation catalyst wherein a material comprising a solution of cobalt nitrate and alumina is heated for removal of liquid therefrom and formation of an agglomerated mass, and the mass is broken up to form granules of a desired size and a substantial amount of fines, that improvement which comprises incorporating catalyst fines in the solid phases with a quantity of the said material and employing the mixture comprising the said catalyst fines in the solid phase for the production of a subsequent quantity of said catalyst by treating the mixture in the manner described for the production of a granular catalyst from the aforesaid material.

2. In the process of producing a catalyst wherein a material comprising components of said catalyst at least one of which is pressed in the material as a solution of a salt is heated for removal of liquid therefrom and formation of an agglomerated mass, and the mass is broken up to form granules of a desired size and a substantial amount of fines, that improvement which comprises comminuting the fines so produced to a granule size smaller than about 100 mesh, and incorporating said comminuted fines in the solid phase with a quantity of the said material and employing the mixture comprising the said catalyst fines in the solid phase for the production of a subsequent quantity of said catalyst by treating the mixture in the manner described for the production of a granular catalyst from the aforesaid material.

3. In the process of producing an ammonia oxidation catalyst wherein a material comprising a solution of a cobalt salt is heated for removal of liquid therefrom and formation of an agglomerated mass, and the mass is broken up to form granules of a desired size and a substantial amount of fines, that improvement which comprises comminuting the fines so produced to a granule size smaller than about 100 mesh and incorporating said comminuted fines in the solid phase with a quantity of the said material and employing the mixture comprising the said catalyst fines in the solid phase for the production of a subsequent quantity of said catalyst by treating the mixture in the manner described for the production of a granular catalyst from the aforesaid material.

4. In the process of producing an ammonia oxidation catalyst wherein a material comprising a solution of cobalt nitrate and alumina is heated for removal of liquid therefrom and formation of an agglomerated mass, and the mass is broken up to form granules of a desired size and a substantial amount of fines, that improvement which comprises comminuting the fines so produced to a granule size smaller than about 100 mesh and incorporating said comminuted fines in the solid phase with a quantity of the said material and employing the mixture comprising the said catalyst fines in the solid phase for the production of a subsequent quantity of said catalyst, by treating the mixture in the manner described for the production of a granular catalyst from the aforesaid material.

5. The process of producing a catalyst material of a substantially uniform granule size containing an oxide of a metal which comprises mixing finely divided catalyst material in the solid phase and containing an oxide of said metal with a predetermined quantity of a solution of a salt of the metal, heating the product to a temperature at which the salt is decomposed forming an oxide of the metal and an agglomerated product is obtained, maintaining said finely divided catalyst material in the solid phase during the aforesaid treatment and heating, reducing the granule size of the agglomerated product, separately recovering the material of a substantially uniform granule size and the fines, and utilizing said fines in the production of a further quantity of the aforesaid catalyst material by the process above described as the finely divided material mixed with a salt solution in the first step.

6. In the process of producing an ammonia oxidation catalyst containing cobalt oxide that improvement which comprises mixing a quantity of said catalyst in the solid phase and in a finely divided condition with an aqueous solution of cobalt nitrate and heating the product comprising said finely divided catalyst in the solid phase to a temperature at which the salt is decomposed and an agglomerated cobalt oxide material is formed therefrom.

7. The process of producing an ammonia oxidation catalyst of a substantially uniform granule size containing an oxide of cobalt and alumina which comprises mixing a quantity of said catalyst material in the solid phase and in a finely divided condition with a predetermined quantity of an aqueous solution of a cobalt salt and an equivalent quantity of alumina, heating the mixture comprising said finely divided catalyst in the solid phase to a temperature at which the salt is decomposed forming an oxide of the metal and an agglomerated product is obtained, reducing the granule size of the agglomerated product, separately recovering the material of a substantially uniform granule size and the fines, and utilizing the fines in the production of a further quantity of catalyst material by the process above outlined as the finely divided material treated with a salt solution in the first step.

8. In the process of producing an ammonia oxidation catalyst wherein a material comprising a promoter and a solution of a cobalt salt is heated for removal of liquid therefrom and formation of an agglomerated mass, and the mass is broken up to form granules of a desired size and a substantial amount of fines, that improvement which comprises comminuting the fines so produced to a granule size smaller than about 100 mesh and incorporating said comminuted fines in the solid phase with a quantity of the said material and employing the mixture comprising said fines in the solid phase for the production of a subsequent quantity of said catalyst by treating the mixture in the manner described for the production of a granular catalyst from the aforesaid material.

9. In the process of producing a granular ammonia oxidation catalyst containing cobalt oxide and a promoter, that improvement which comprises mixing a quantity of said catalyst in the solid phase and in a finely divided condition and of said promoter with an aqueous solution of cobalt nitrate and heating the product comprising said finely divided catalyst in the solid phase to a temperature at which the salt is decomposed and an agglomerated cobalt oxide material is formed therefrom.

10. The process of producing a catalyst which comprises heating a material comprising components of said catalyst, at least one of which is present in the material as a solution of a salt, to remove liquid therefrom and to form an agglomerated mass, breaking up the agglomerated mass into granules, separating the granules of desired size from the catalyst fines, incorporating said catalyst fines in the solid phase with a quantity of the aforesaid material comprising catalyst components and recovering from the mixture thus prepared catalyst granules of desired size by treating the mixture in the manner described for treating the aforesaid material.

11. The process of producing a cobalt oxide-aluminum oxide catalyst which comprises heating a material comprising components of said catalyst, at least one of which is present in the material as a solution of the salt, to remove liquid therefrom and to form an agglomerated mass, breaking up the agglomerated mass into granules, separating the granules of desired size from the catalyst fines, incorporating said catalyst fines in the solid phase with a quantity of the aforesaid material comprising catalyst components and recovering from the mixture thus prepared catalyst granules of desired size by treating the mixture in the manner described for treating the aforesaid material.

12. The process of producing an ammonia oxidation catalyst which comprises heating a material comprising a solution of a cobalt salt for the removal of liquid therefrom and formation of an agglomerated mass, breaking up the agglomerated mass into granules, separating the granules of desired size from the catalyst fines, incorporating said catalyst fines in the solid phase with a quantity of the aforesaid material comprising a solution of a cobalt salt and recovering from the mixture thus prepared catalyst granules of desired size by treating the mixture in the manner described for treating the aforesaid material.

13. The process of producing an ammonia oxidation catalyst which comprises heating a material comprising a solution of cobalt nitrate to remove liquid therefrom and to form an agglomerated mass, breaking up the agglomerated mass into granules, separating the granules of desired size from the catalyst fines, incorporating said catalyst fines in the solid phase with a quantity of the aforesaid material comprising cobalt nitrate and recovering from the mixture thus prepared catalyst granules of desired size by treating the mixture in the manner described for treating the aforesaid material.

MAYOR FARTHING FOGLER.

CERTIFICATE OF CORRECTION.

Patent No. 1,936,936.                                                      November 28, 1933.

MAYOR FARTHING FOGLER.

It is hereby certified that error appears in the printed specification of the above numbered patent requiring correction as follows: Page 2, line 75, claim 1, for "phases" read phase; and line 84, claim 2, for "pressed" read present; and that the said Letters Patent should be read with these corrections therein that the same may conform to the record of the case in the Patent Office.

Signed and sealed this 9th day of January, A. D. 1934.

F. M. Hopkins (Seal)                                                       Acting Commissioner of Patents.